United States Patent [19]

Hoshi

[11] 4,402,379

[45] Sep. 6, 1983

[54] AIR CLEANER SYSTEM FOR MOTORCYCLES

[75] Inventor: Norio Hoshi, Fujimi, Japan

[73] Assignee: Honda Giken Kogyo Kabushiki Kaisha, Tokyo, Japan

[21] Appl. No.: 279,049

[22] Filed: Jun. 30, 1981

[30] Foreign Application Priority Data

Jun. 30, 1980 [JP] Japan ................... 55-88866
Sep. 2, 1980 [JP] Japan ................. 55-121587

[51] Int. Cl.³ ............................................. B62K 11/08
[52] U.S. Cl. .................................. 180/225; 55/385 B
[58] Field of Search ...................... 180/225, 227, 219; 55/385 R, 385 B, DIG. 28

[56] References Cited

U.S. PATENT DOCUMENTS 2,329,248  9/1943  Carlson ............................... 180/219
4,321,978  3/1982  Tominaga et al. .................. 180/225

Primary Examiner—John A. Pekar
Assistant Examiner—D. Lynn Fugate
Attorney, Agent, or Firm—Irving M. Weiner; Pamela S. Burt; John L. Shortley

[57] ABSTRACT

An air cleaner system for a motorcycle having a single shock absorber disposed between an engine and a rear wheel so as to be close to the center of gravity of the vehicle body. The air cleaner system includes substantially one casing having an air intake opening and an air cleaner element provided therein, the casing being disposed between the engine and rear wheel substantially surrounding at least part of the shock absorber. The relatively large space between the engine and rear wheel is thus effectively utilized such that the air cleaner system has a desirably large capacity for supplying air to a multiple-cylinder, multiple-carburetor engine, and at the same time good maneuverability and high stability of the motorcycle is ensured.

10 Claims, 13 Drawing Figures

AIR CLEANER SYSTEM FOR MOTORCYCLES

BACKGROUND OF THE INVENTION

1. Field of the Invention

The present invention relates generally to an air cleaner system for a motorcycle of the type having a single shock absorber disposed between an engine and a rear wheel.

2. Description of Relevant Art

A known shock absorbing system for motorcycles such as those employed for racing, in which reduction of the weight is critical, comprises a single damper combined with a coil spring disposed between a rear fork and a body frame to reduce the overall weight. A known shock absorbing system for ordinary motorcycles, on the other hand, comprises two dampers with coil springs, which are disposed on either side of a rear wheel. In the aforesaid motorcycle for special uses such as racing, because good maneuverability and high stability are especially required, the shock absorber is positioned as close as possible to the center of gravity of the vehicle body between the engine and the rear wheel in order to reduce the moment of inertia about the center of gravity.

It is well known that the engine of a motorcycle must be provided with an air cleaner system upstream of the carburetor to supply clean air to the engine. The air cleaner system is usually disposed at the rear side of the engine, so as to avoid interference with the rear wheel. When the shock absorber is disposed between the engine and the rear wheel so as to be close to the center of gravity of the motorcycle, the space between the engine and the shock absorber is substantially reduced, and the capacity of the air cleaner is accordingly limited by the shock absorber, thus making the provision of an air suction system including an air cleaner of a large capacity impossible. A racing motorcycle, in particular, requires high engine performance, which is greatly dependent upon the capacity of the air cleaner.

Thus, two requirements, i.e., appropriately positioning a shock absorber so as to improve maneuverability and stability of a motorcycle on the one hand, and increasing the capacity of the air cleaner so as to improve engine performance on the other hand, conflict with each other. Accordingly, there has developed a desideratum for an arrangement which simultaneously satisfies both of the aforesaid conflicting requirements.

The present invention eminently fulfills the aforesaid desideratum by providing an air cleaner system wherein the shock absorber is disposed close to the center of gravity of the body of a motorcycle without undesirably reducing the capacity of the air cleaner system.

SUMMARY OF THE INVENTION

The present invention provides an air cleaner system in a motorcycle having a single shock absorber disposed between a body frame and a rear fork supporting a rear wheel, the shock absorber being disposed between an engine and the rear wheel so as to be close to the center of gravity of a vehicle body. The air cleaner system of the present invention comprises substantially one casing, at least one air intake opening provided in the casing, at least one cleaner element disposed in the casing proximal to the air intake opening, and conduit members providing fluid communication between the casing and an air-fuel mixing system positioned downstream of the air cleaner system. The casing is disposed between the engine and the rear wheel to substantially surround at least part of the shock absorber. The casing includes a first section disposed between the engine and the shock absorber, and a second section disposed between the shock absorber and the rear wheel. The conduit members are provided on the first section of the casing.

An object of the present invention is to provide a motorcycle air cleaner system which is capable of supplying sufficient clean air to the engine, without impairing the maneuverability and stability of the motorcycle, by effectively utilizing the relatively large space between the engine and the rear wheel, particularly, the space around the shock absorber.

Another object of the present invention is to provide a motorcycle air cleaner system which is capable of supplying clean air to a multiple-cylinder engine of a multiple-carburetor type and which is capable of improving engine performance by substantially increasing the capacity of the air cleaner to improve the suction efficiency by disposing an air chamber between the engine and the shock absorber.

A further object of the present invention is to provide an air cleaner system capable of ensuring a greater filtering area, cooling the shock absorber, and suppressing the noise generated by the shock absorber by enclosing the shock absorber within an air cleaner element.

The above and other objects and details of the present invention will become more apparent from the following detailed description, when read in conjunction with the accompanying drawings.

DETAILED DESCRIPTION OF PREFERRED EMBODIMENTS

Figure 1:
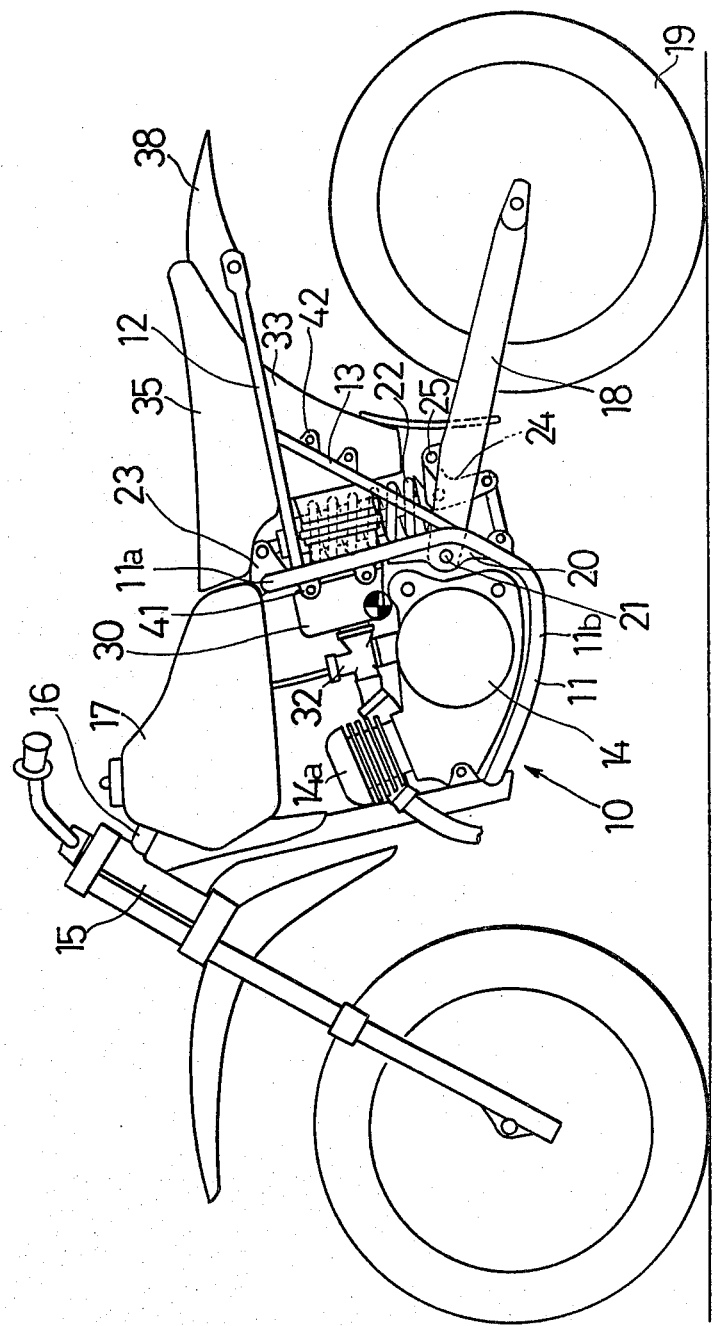
FIG. 1 is an overall side elevational view of a motorcycle provided with an air cleaner system according to the present invention.
Figure 2:
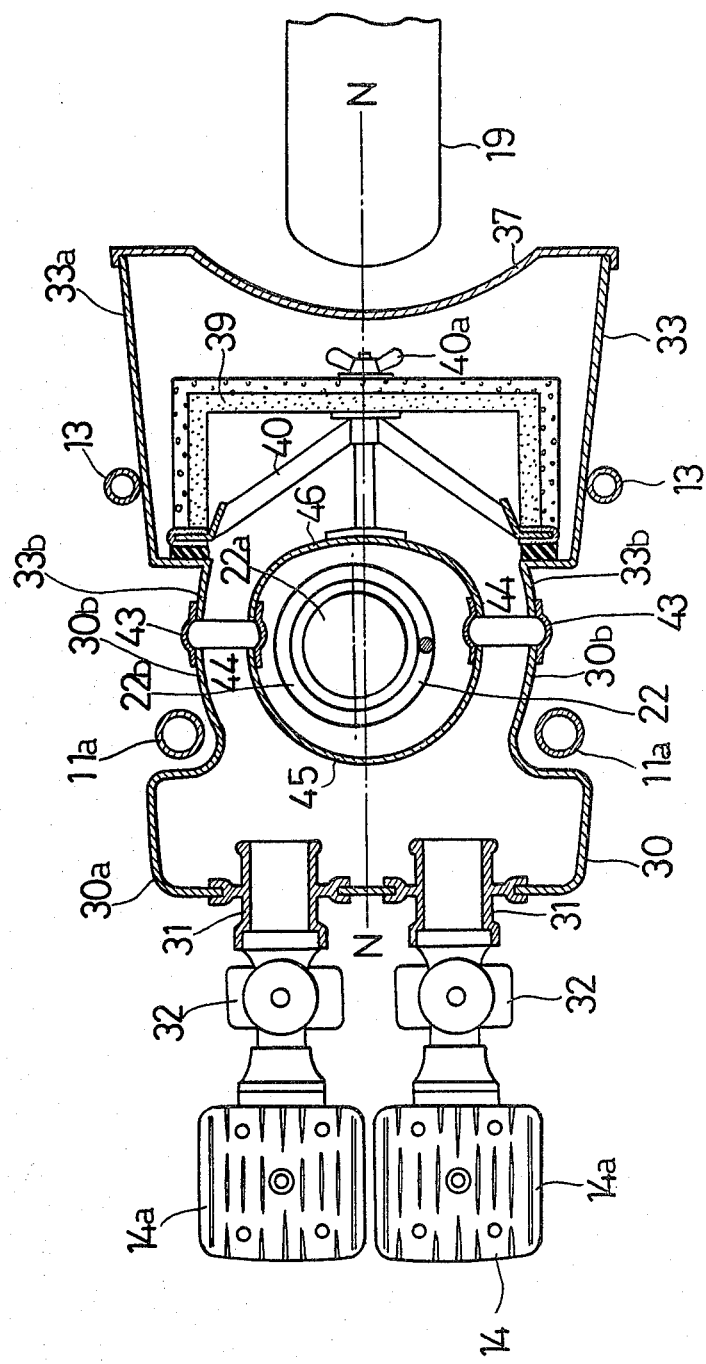
FIG. 2 is a cross-sectional view of the air cleaner system shown in FIG. 1, connected with an engine through a carburetor.

With reference to FIGS. 1 and 2, a body frame assembly 10 of the cradle type comprises a substantially U-shaped front frame 11, a rear frame 12 joined to and extending rearwardly from the standing rear part 11a of the front frame 11, and a diagonal frame 13 connected with the bottom end of the standing rear part 11a and supporting the rear frame 12. A multiple-cylinder engine, i.e., a parallel 2-cylinder 2-cycle engine 14 in the present embodiment, is mounted on the bottom part 11b of the front frame 11. A fuel tank 17 is mounted on a main pipe 16 extending rearwardly from a head tube 15. A rear wheel 19 is rotatably supported by a rear fork 18. The front end of the rear fork 18 is pivotably connected by a shaft 21 to the body frame 10 at the bracket 20 provided at the lower end of the standing part 11a of the front frame 11 so that the rear fork 18 is swingable about the shaft 21 in response to vertical movement of the rear wheel 19 as it follows uneven road surfaces.

A shock absorber 22 for damping and absorbing vertical movement of the rear wheel 19 is disposed between the body frame 10 and the rear fork 18. The shock absorber 22 comprises a combination of a damper 22a and a coil spring 22b arranged around the damper. The shock absorber 22 is disposed close to the longitudinal center line N—N of the vehicle body (FIG. 2). The upper end of the shock absorber 22 is pivotably connected to a bracket 23 provided at the upper end of the standing part 11a of the front frame 11, while the lower end of shock absorber 22 is joined with the rear fork at a position in the front part of the rear fork 18 near the front frame 11, through a link member 24. By thus employing only a single shock absorber 22, reduction in the weight of the body is attained and, furthermore, by disposing the shock absorber close to the center of gravity of the vehicle body, the moment of inertia about the center of gravity of the body can be reduced.

As shown in FIG. 2, an air chamber assembly 30 having a case 30a made of synthetic resin, such as FRP for example, is disposed between the shock absorber 22 and the engine 14. Two conical tubes 31 are fitted to the front face of the case 30a, the conical tubes 31 being respectively connected to two carburetors 32 provided for the respective two engine cylinders 14a. This arrangement permits the supply of air from the air chamber assembly 30 to the respective carburetors 32 of the 2-cylinder engine 14 of the 2-carburetor type, in common through the conical tubes 31.

Figure 3:
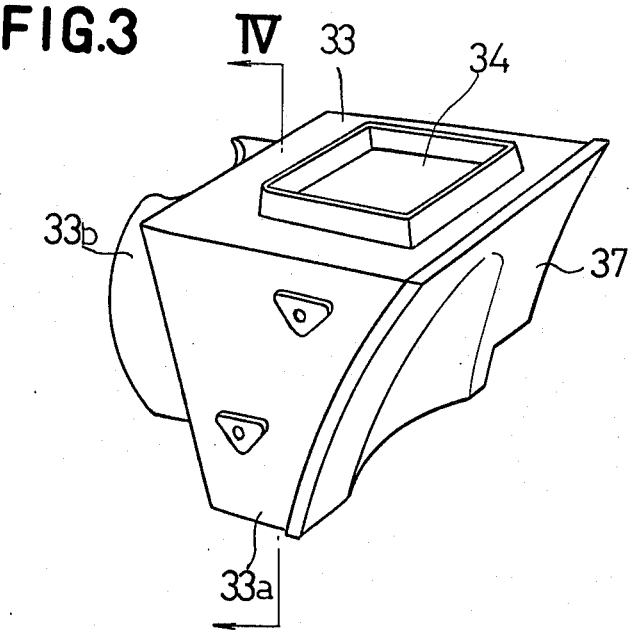
FIG. 3 is a perspective view of an air cleaner case of the air cleaner system shown in FIG. 1.
Figure 4:
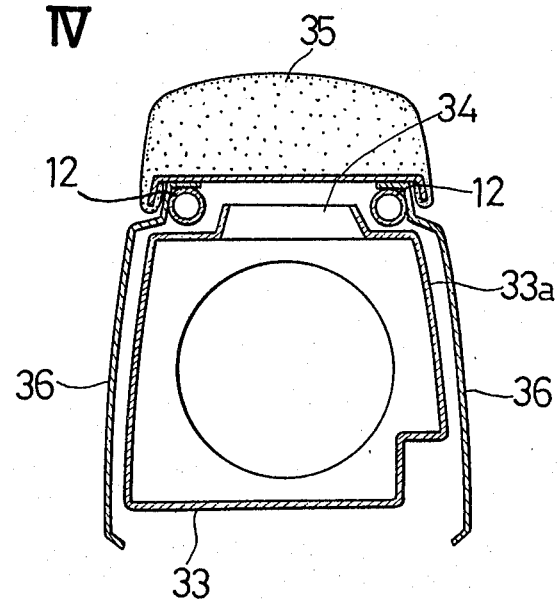
FIG. 4 is a vertical sectional view of the air cleaner case taken along line IV—IV in FIG. 3, showing the location thereof relative to a seat and side covers.

An air cleaner 33 comprising a case 33a made of a material such as that of case 30a is disposed between the shock absorber 22 and the rear wheel 19. An air intake opening 34 is provided on the upper wall of case 33a as shown in FIGS. 3 and 4. The air intake opening 34 is covered by a driver's seat 35 mounted on the rear frame 12 so that the entrance of dust into the air cleaner 33 is prevented. In FIG. 4, a pair of side covers 36 are shown as attached to the rear frame 12 so as to cover each side of the air cleaner 33. The rear end opening of the case 33a of the air cleaner 33 is closed with a removable lid plate 37 (FIGS. 2 and 3) which has a radius of curvature substantially the same as that of the rear fender 38 (FIG. 1). When performing maintenance work, such as replacement of the air cleaner element 39 provided within the air cleaner case 33a, the cover plate 37 is first removed. The air cleaner element 39 can be removed by unfastening a wing nut 40a and detaching the air cleaner element 39 from a supporting member 40.

The air chamber assembly 30 is fixed to a bracket 41 provided for the standing part 11a of the front frame 11 as shown in FIG. 1, while the air cleaner 33 is fixed to a bracket 42 provided for the diagonal frame 13.

The air chamber case 30a is integrally formed with forked extensions 30b extending rearwardly. The extensions 30b have a common wall 45 curved to round a front half of the periphery of the shock absorber with sufficient intervening clearance to prevent interference with the shock absorber 22. The air cleaner case 33a is also integrally formed with forked extensions 33b extending forwardly, which have a common wall 46 curved to round a rear half of the periphery of the shock absorber 22, similarly to the wall 45. Passages 44 connecting th air chamber assembly 30 and the air cleaner 33 are provided on either side of the shock absorber by joining the pairs of extensions 30b and 33b with connectors 43. The shock absorber 22 is thus surrounded by a combination of the air chamber 30 and the air cleaner 33. The air sucked into the air cleaner 33 through the air intake opening 34 is cleaned by the air cleaner element 39, then flows into the air chamber 30 by way of the passages 44. The cleaned air is distributed to the carburetors 32 through the respective conical tubes 31 from the air chamber assembly 30 which functions as an air accumulator.

The shock absorber 22 is disposed close to the center of gravity of the vehicle body. Therefore, only a limited space is available between the engine 14 and the shock absorber 22, however, the air chamber assembly 30 is provided between the engine 14 and the shock absorber 22 so that the limited space is effectively utilized for increasing the working capacity of the air cleaner 33. Thus, the air cleaner system is capable of supplying sufficient air to the engine 14. This effect of the air chamber assembly 30 functioning as an air accumulator contributes, in particular, to the improvement in air suction efficiency of the carburetors 32 of a multiple-cylinder engine of the multiple-carburetor type, i.e., a 2-cylinder engine of the 2-carburetor type 14 in the present embodiment, which results in an improvement in the output and performance of the engine 14 of such type.

Figure 5:
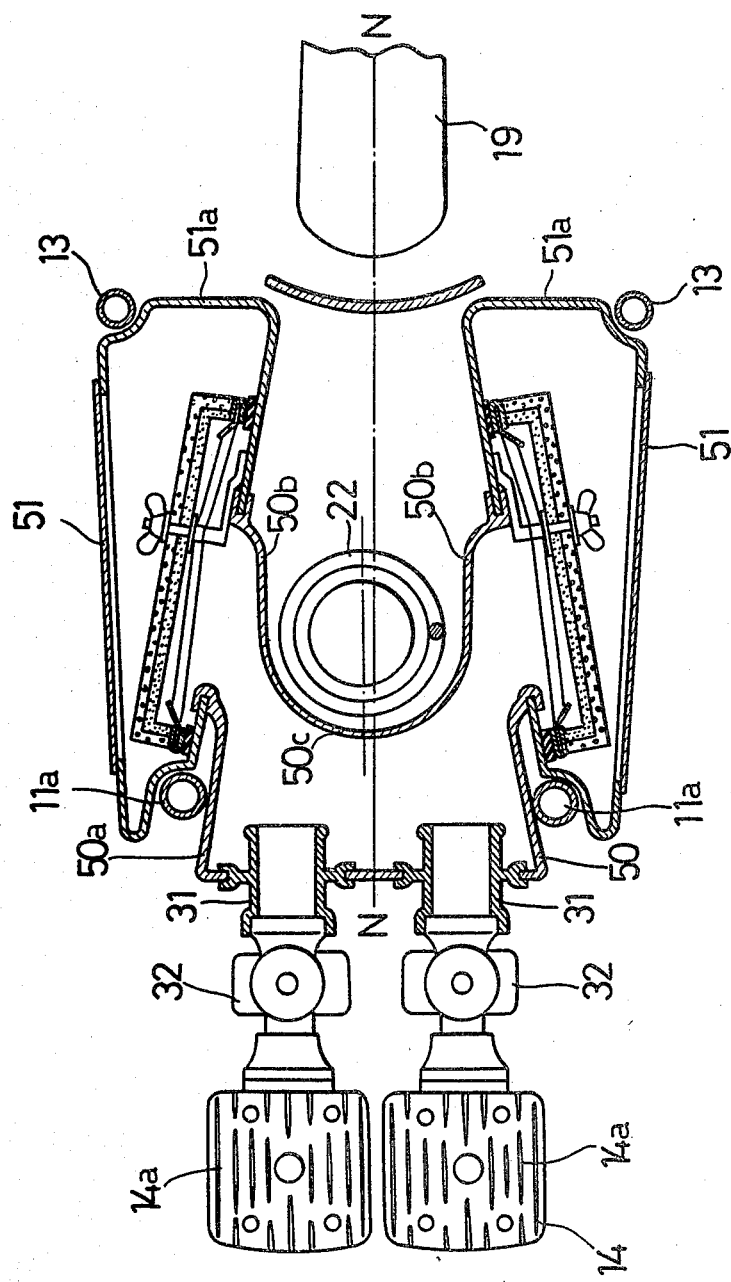
FIG. 5 is a cross-sectional view, similar to FIG. 2, of an air cleaner system according to a second embodiment of the present invention.
Figure 6:
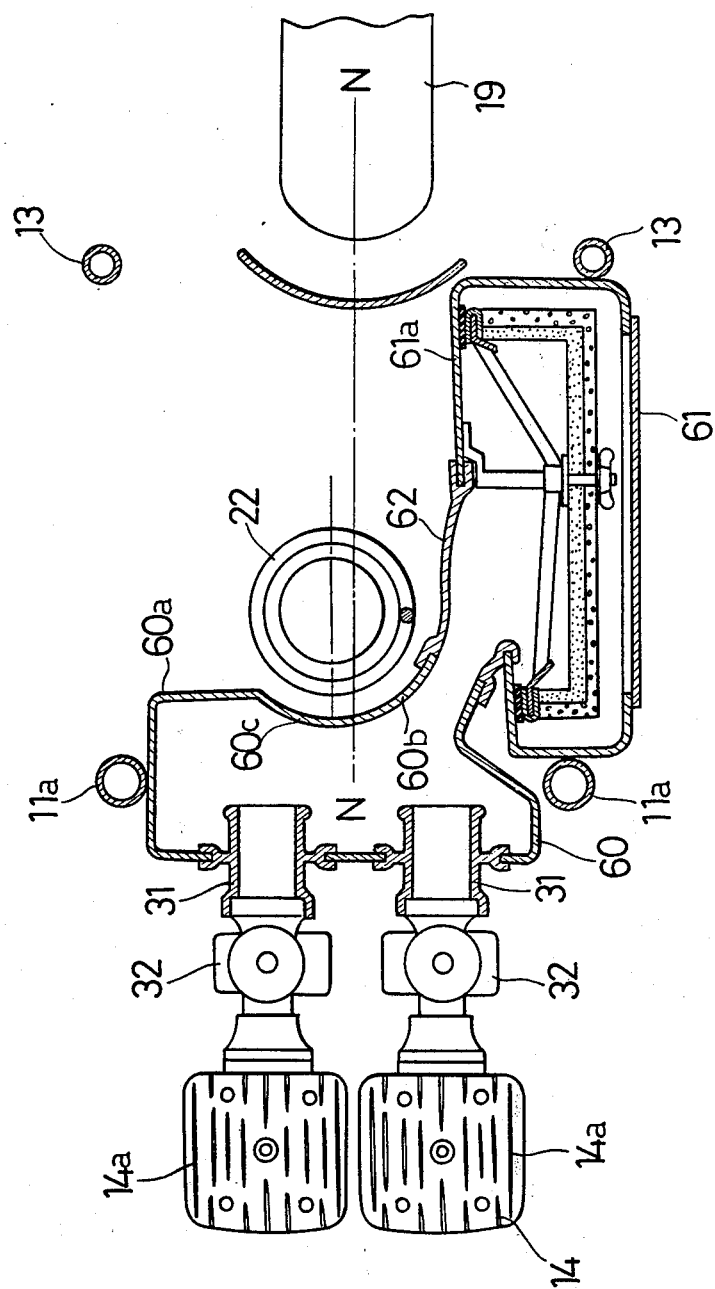
FIG. 6 is a cross-sectional view, similar to FIG. 2, of an air cleaner system according to a third embodiment of the present invention.

FIGS. 5 and 6 show second and third embodiments, respectively, according to the present invention. In these figures, members or parts similar to those of the first embodiment are designated by the same reference numerals, i.e., an engine 14, a cylinder 14a of the engine 14, a rear wheel 19, a shock absorber 22, conical tubes 31 and carburetors 32.

With reference to FIG. 5 showing the second embodiment, an air chamber assembly 50 is disposed within a space between the engine 14 and the shock absorber 22. Air cleaners 51 are provided on the respective sides of the shock absorber 22. Rearwardly forked extensions 50b formed integrally with an air chamber case 50a have a wall 50c therebetween which is curved symmetrically with respect to the longitudinal axis N—N of the vehicle body, avoiding interference with the shock absorber 22. Each extension 50b is joined with a portion of a case 51a of the air cleaner 51.

In the third embodiment of the invention shown in FIG. 6, an air chamber assembly 60 is disposed within a space between an engine 14 and a shock absorber 22. An air cleaner 61 is disposed on either one of the sides of the shock absorber 22. A case 60a of the air chamber assembly 60 is formed integrally with a rearward extension 60b which has a wall 60c curved so as to avoid interference with the shock absorber 22. The extension 60b is connected with a case 61a of the air cleaner 61 by means of a conical tube 62.

With the above-described arrangement of the second and third embodiments, the capacity of the air cleaner system is further increased by the large capacities of the air chambers 50 and 60, respectively, and the air suction efficiency and performance of the engine is thus enhanced.

FIGS. 7 to 13 show a modified fourth embodiment in accordance with the invention wherein an air cleaner system without an air chamber is disposed between the engine and the rear wheel. In FIGS. 7 to 13, members or parts similar to those of the preceding embodiments are designated by the same reference numerals.

Figure 7:
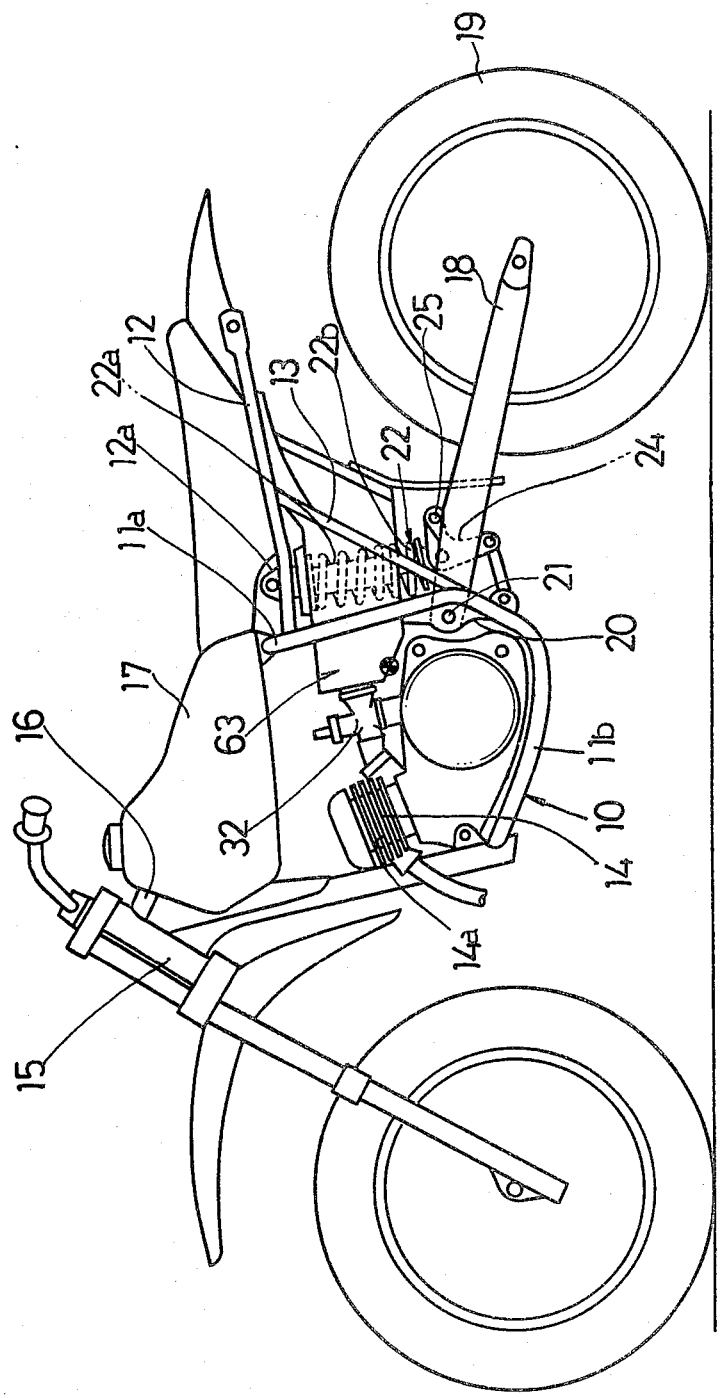
FIG. 7 is an overall side elevational view of a motorcycle provided with an air cleaner system according to a fourth embodiment of the present invention.
Figure 8:
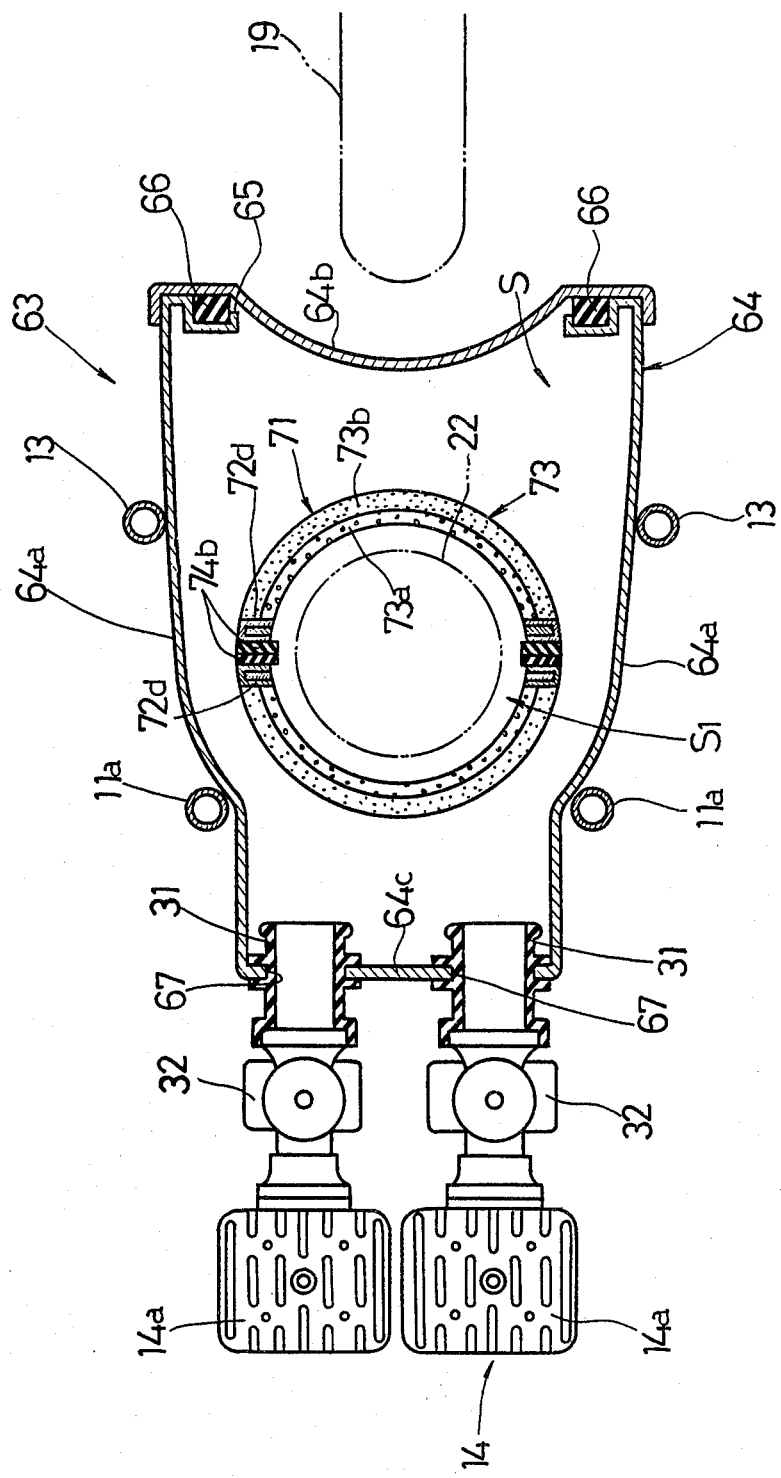
FIG. 8 is a cross-sectional view of the air cleaner system shown in FIG. 7.
Figure 9:
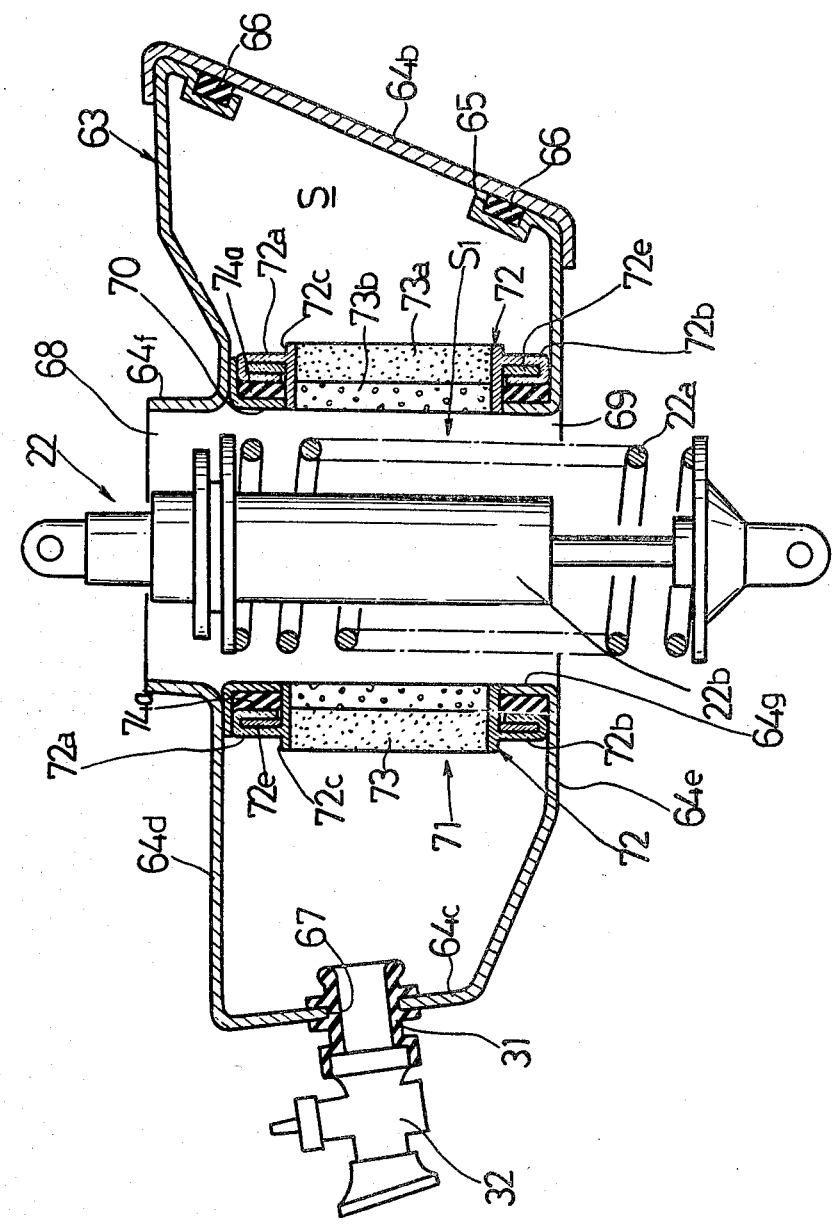
FIG. 9 is a longitudinal vertical section of the air cleaner system shown in FIG. 8, together with a shock absorber surrounded by the system.
Figure 10:
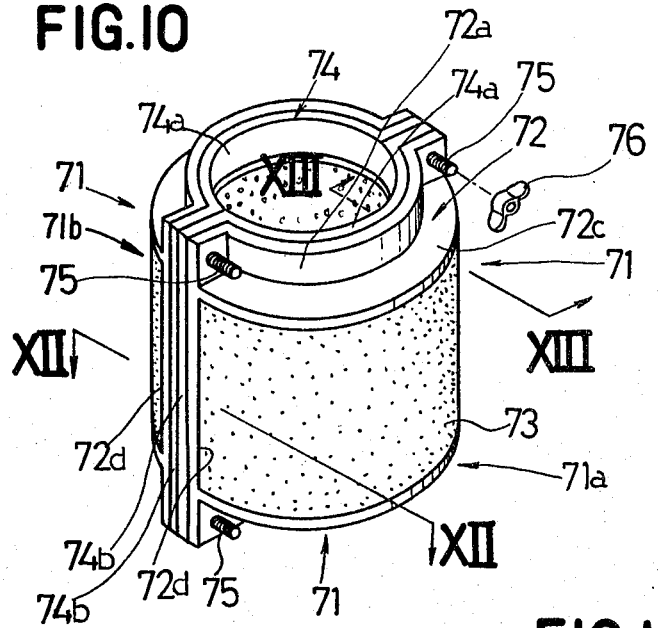
FIG. 10 is a perspective view of air cleaner elements shown in FIG. 9.
Figure 12:
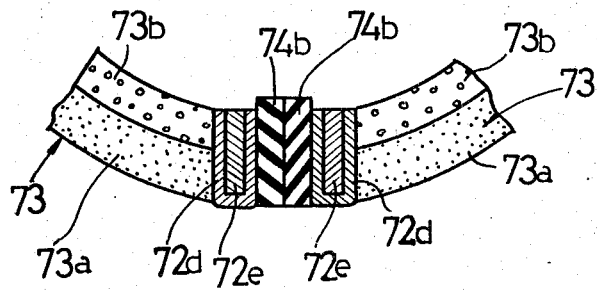
FIG. 12 is an enlarged partial cross-sectional view taken along line XII—XII in FIG. 10.
Figure 11:
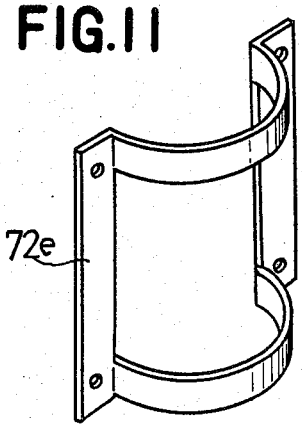
FIG. 11 is a perspective view of a core piece of the air cleaner element shown in FIG. 10.
Figure 13:
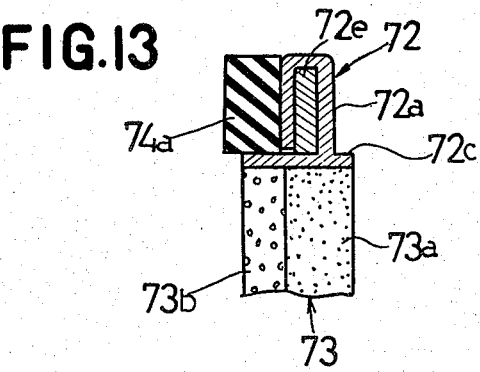
FIG. 13 is an enlarged partial vertical sectional view taken along line XIII—XIII in FIG. 10.

With reference to FIG. 7, a frame assembly 10 of a motorcycle comprises a substantially U-shaped front frame 11, a rear frame 12 joined with the front frame 11 at the upper part of the standing part 11a of the front frame 11 and a diagonal frame 13 connecting the lower end of the standing part 11a to the intermediate part of the rear frame 12. An engine 14, which comprises a parallel 2-cylinder engine in this embodiment, is mounted on the bottom part of the front frame 11. A fuel tank 17 is mounted on a main pipe 16 extending rearwardly from a head tube 15. A front fork, which comprises a front wheel suspension system, is rotatably supported by the head tube 15. A steering handlebar is attached to the top bridge of the bridge assembly for connecting the front fork to the head tube 15. A rear fork 18 is pivotally connected at its front end by a pin 21 to a bracket 20 provided at the lower part of the standing part 11a of the frame 11. A rear wheel 19 is supported by a shaft on the rear fork 18 at the rear ends thereof. Movement of the rear wheel 19 in following an uneven road surface is permitted by the swing motion of the rear fork 18 about the pin 21. A shock absorber 22 for damping and absorbing the vertical swing motion of the rear fork 18 is disposed between the frame assembly 10 and the rear fork 18. The shock absorber 22 comprises a damper 22a and a coil spring 22b arranged around the damper. The shock absorber 22 is disposed in alignment with or close to the longitudinal axis of the vehicle body. The upper end of the shock absorber 22 is pivotably connected to the bracket 12a provided on the front part of the rear frame 12, while the lower end of the shock absorber 22 is connected to the front part of the rear fork 18 through a link 24.

The shock absorber 22 is thus disposed as close as possible to the center of gravity of the vehicle body, between the engine 14 and the rear wheel 19.

FIGS. 8 to 13 show the air cleaner system 63 of the present fourth embodiment. An air cleaner case 64 is disposed rearwardly of carburetors 32 and properly spaced from the rear wheel 19. The air cleaner case 64 is formed to have a sealed box configuration. In this embodiment, the rear end of the air cleaner is operable at 65 and is sealed by a lid plate 64b through a sealing member 66. A front wall 64c of the air cleaner case 64 is formed with openings 67 in which conical tubes 31 are fitted for providing a fluid connection between the carburetors 32 and the interior S of the air cleaner case 64. Because the air cleaner case 64 per se is disposed between the carburetors 32 and the rear wheel 19 to surround the shock absorber 22, the air cleaner system of the present fourth embodiment also has a large air-suction capacity.

On the upper and lower walls 64d and 64e of the air cleaner case 64, circular openings 68 and 69 are respectively formed. The diameters of the openings 68 and 69 are large enough relative to the peripheral diameter of the shock absorber 22 to ensure an operating space $S_1$ which allows combined swing and axial movement of the shock absorber 22 without interfering with the air cleaner case 64. The shock absorber 22 is disposed with its assembly extending through the openings 68 and 69, respectively, and is pivotably connected at its upper and lower ends to the frame 12 and the link 24, respectively. The inner peripheral edge of the opening 68 on the upper wall 64d is bent upwardly to form an annular wall 64f, while the inner peripheral edge of the opening 69 on the lower wall 64e is bent upwardly to form a ring stopper 64g. An annular ring stopper 70 is attached to the inside of the upper wall 64d so as to be directed downwardly and in concentric relation with the ring stopper 64g. An air cleaner element 71 is formed to have a hollow cylindrical configuration by a pair of cleaner element halves 71a and 71b, each including a filter holding frame 72 having a semicircular cross section. Each frame 72 is preferably made of a synthetic resin and comprises upper and lower edges 72a and 72b, flanges 72c extending radially from the inner ends of the upper and lower edges, and side edges 72d. Core metal pieces 72e (FIG. 11) are embedded within the upper, lower and side edges 72a, 72b and 72d. A semicylindrical filter 73 having inner and outer diameters substantially equal to those of the frame 72 is fitted in and attached by a suitable adhesive to the frame 72 between the flanges 72c and between the side edges 72d. The filter 73 is formed to have a double-wall construction with an outer member 73a of rough mesh and an inner member 73b of fine mesh. The thus-assembled pair of semicylindrical cleaner element halves 71a and 71b are joined together with their corresponding flat surfaces opposite to each other to form the cylindrical air cleaner element 71. The thus-assembled air cleaner element 71 is disposed inside the air cleaner case 64 in concentric relation with the upper and lower openings 68 and 69. In joining the cleaner element halves 71a and 71b, rubber sealing members 74 (FIG. 10) are sandwiched between the corresponding joining surfaces of the upper, lower and side edges 72a, 72b and 72d of the filter holding frame 72. The rubber sealing members 74 are joined with their side edges 74b tightly abutting in face-to-face relation to each other, while the upper and lower edges 74a of the rubber sealing member 74 are interposed between the outer surfaces of the ring stoppers 70 and 64g and the upper and lower edges 72a and 72b of the filter holding frame, respectively. The air cleaner element 71 is secured to the ring stoppers 70 and 64g by fitting the cleaner element halves 71a and 71b onto the ring stoppers 70 and 64g and by fastening the cleaner element halves 71a and 71b to the ring stoppers by means of bolts 75 and wing nuts 76 at the upper and lower ends of the side edges 72d. Thus, the hollow and cylindrical air cleaner element 71 is substantially vertically disposed between the upper and lower openings 68 and 69 to surround the shock absorber with a sufficient shock-absorber operating space $S_1$ ensured. The inner surface of the filter element 73 is exposed to the incoming air and faces the shock absorber 22. The space S within the air cleaner case 64 and the operating space $S_1$ are separated by the filter member 73.

Air is taken into the air cleaner case 64 from the operating space $S_1$ surrounding the shock absorber 22 through the filter member 73. The outer member 73a of the filter member 73 of rough mesh removes rough dust from the air, while the inner filter member 73b removes fine dust, so that clean air enters the space S. With such arrangement, because the entire inner surface of the cylindrical filter member 73 faces the space $S_1$ surrounding the shock absorber 22, the filter member is adapted to provide a large filtering area. Accordingly, the air cleaner element 71 is capable of supplying a necessary and sufficient quantity of air for the large capacity of the air cleaner case 64 and of the plurality of carburetors. Further, the external air flowing around the shock absorber 22 and entering the air cleaner case 64 serves to cool the damper 22b. Still further, the noise generated by the operation of damper 22b is absorbed by the filter member 73, and thus the arrangement of this embodiment provides a noise suppressing effect.

Although the invention has been described hereinabove in its preferred forms with some degree of particularity, it is to be understood that the details of construction and combination and arrangement of parts as disclosed herein may be changed without departing from the spirit and scope of the invention as hereinafter claimed.

I claim:

1. An air cleaner system in a motorcycle having a single shock absorber disposed between a body frame and a rear fork supporting a rear wheel, said shock absorber being disposed between an engine and said rear wheel to be close to the center of gravity of a vehicle body, comprising:
    substantially one casing including a first section disposed between said engine and said shock absorber, and a second section disposed substantially between said shock absorber and said rear wheel;
    said casing being provided with at least one air intake opening;
    at least one cleaner element disposed in said casing substantially proximal to said air intake opening;
    conduit means for providing fluid communication between said casing and an air-fuel mixing system positioned downstream of said air cleaner system;
    said conduit means being provided on said first section of said casing; and
    said casing being disposed between said engine and said rear wheel, substantially surrounding at least part of said shock absorber.

2. An air cleaner system according to claim 1, wherein:
    said air intake opening is provided in said second section of said casing;
    said cleaner element is disposed in said second section of said casing; and
    said system is arranged such that air introduced from said air intake opening flows into said first section of said casing to be accumulated therein, through said cleaner element.

3. An air cleaner system according to claim 2, wherein:
    said first and second sections of said casing are substantially divided from each other with communication means provided therebetween.

4. An air cleaner system according to claim 3, wherein:
    each of said first and second sections of said casing includes a wall, said walls cooperating to substantially surround said shock absorber.

5. An air cleaner system according to claim 1, 2, 3 or 4, wherein:
    said first and second sections of said casing are formed of separate members, respectively.

6. An air cleaner system according to claim 1, wherein:
    said air intake opening and said cleaner element are provided between said first section and said second section of said casing.

7. An air cleaner system according to claim 6, wherein:
    said air intake opening is provided in either of the upper or lower walls of said casing, through which said shock absorber extends substantially vertically.

8. An air cleaner system according to claim 6, wherein:
    said cleaner element is arranged so as to surround said shock absorber.

9. An air cleaner system according to claim 1, 7, 8 or 9, wherein:
    said first and second sections of said casing are integrally formed of a single member.

10. An air cleaner system according to claim 1, wherein:
    said conduit means comprises a plurality of tubes, each said tube connecting said casing to one of a plurality of carburetors of a multiple-cylinder engine.

* * * * *